Dec. 22, 1942. G. ANTONIETTI 2,306,103
MACHINE FOR COMPRESSING AND FORMING PLASTIC MATERIALS
Filed Dec. 12, 1939 5 Sheets-Sheet 1
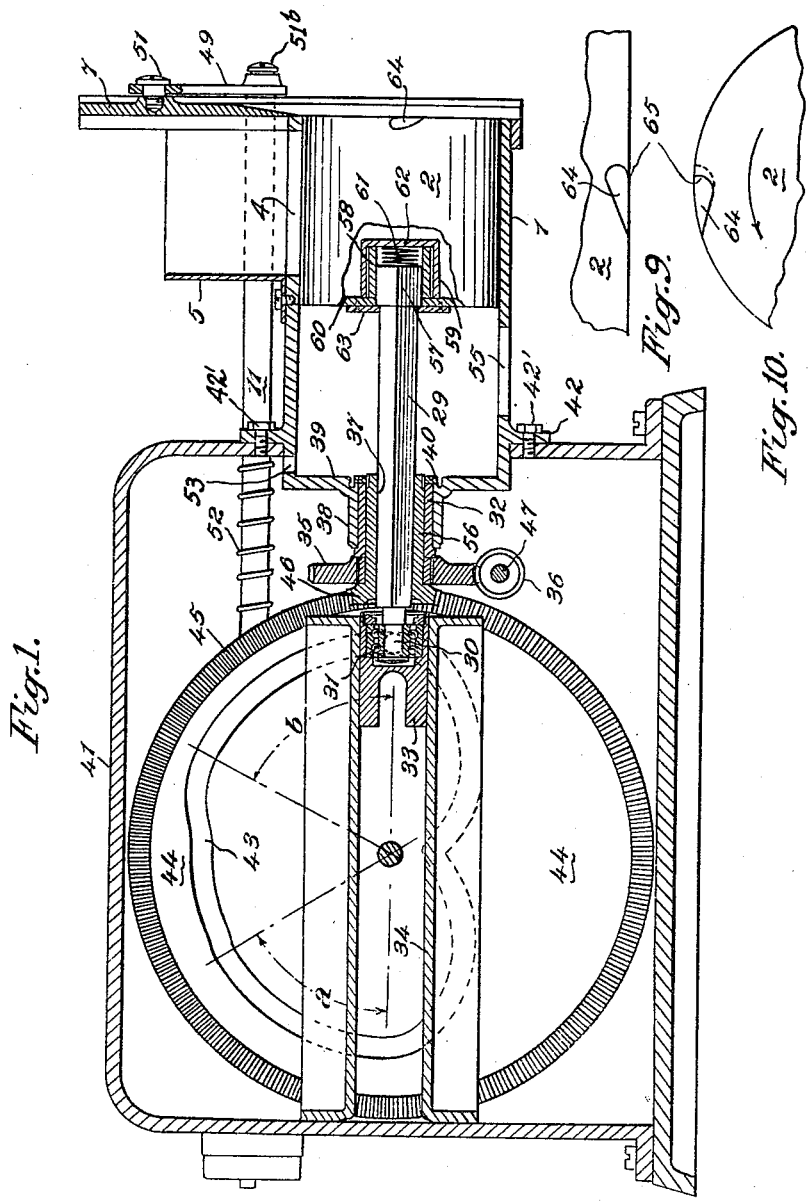
Inventor
G. Antonietti
By: Glascock Downing & Seebold
Attys.

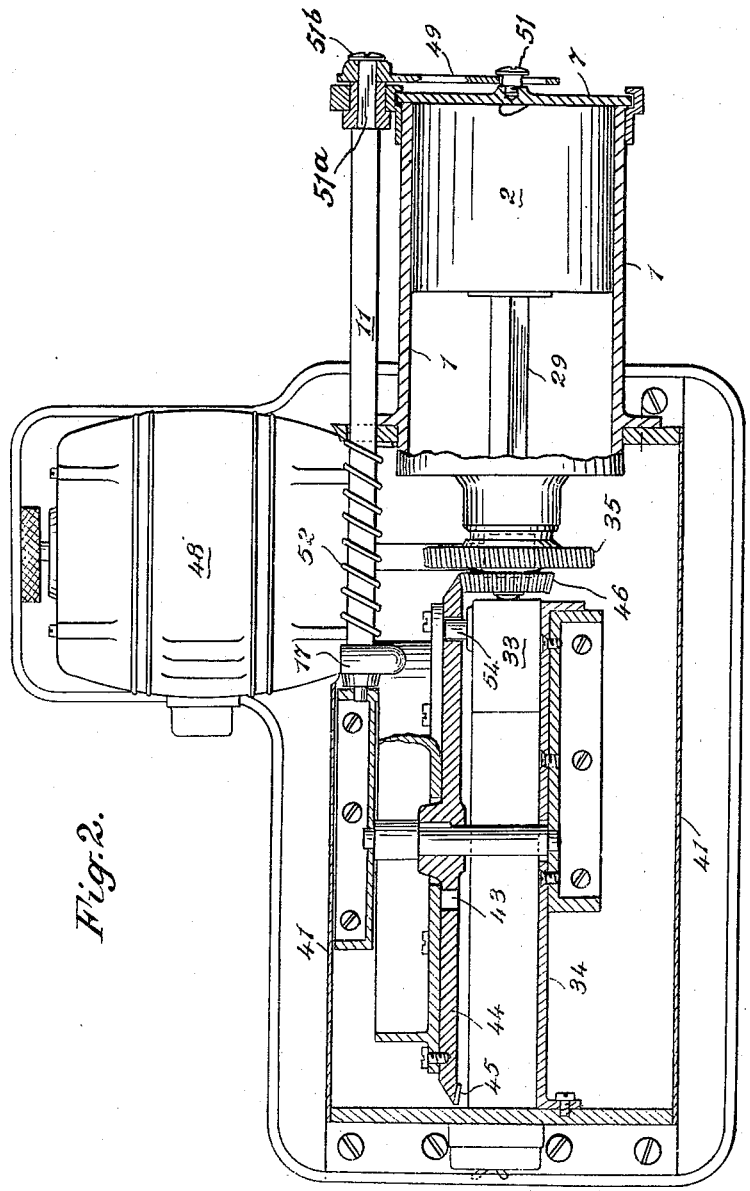

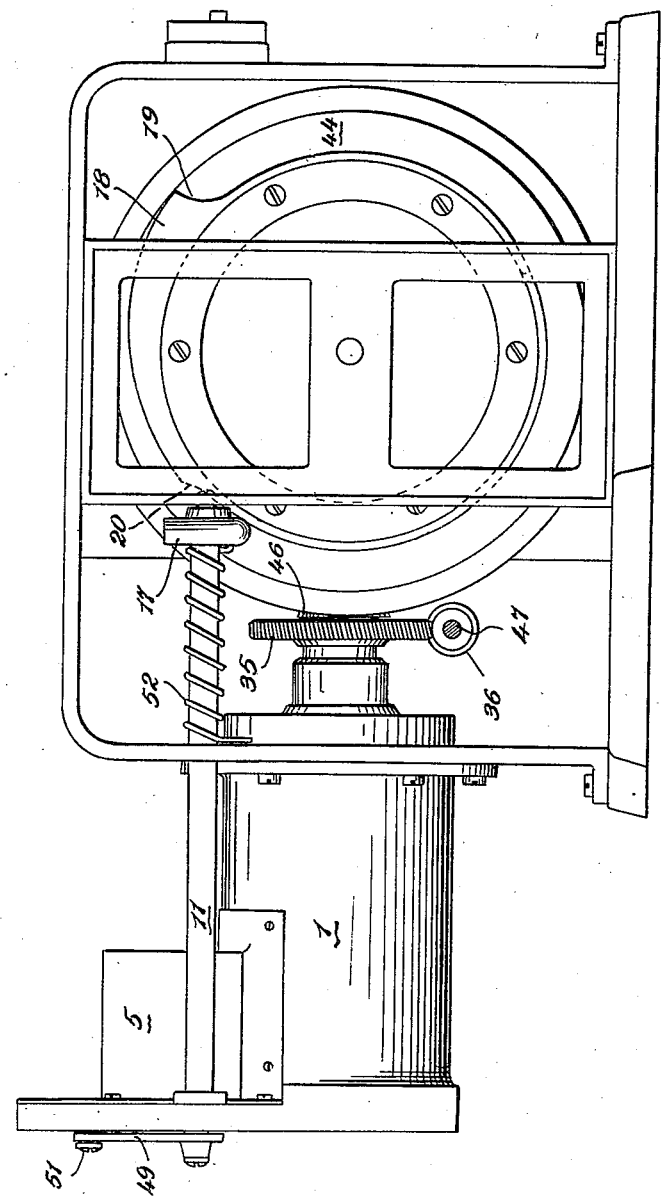

Dec. 22, 1942.   G. ANTONIETTI   2,306,103
MACHINE FOR COMPRESSING AND FORMING PLASTIC MATERIALS
Filed Dec. 12, 1939   5 Sheets-Sheet 4
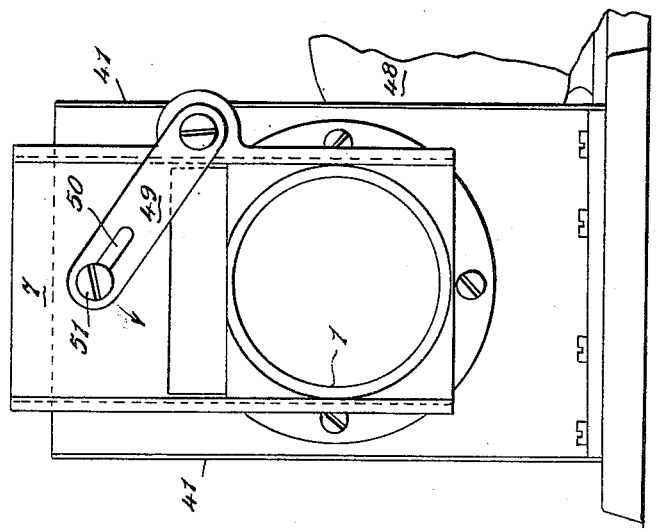
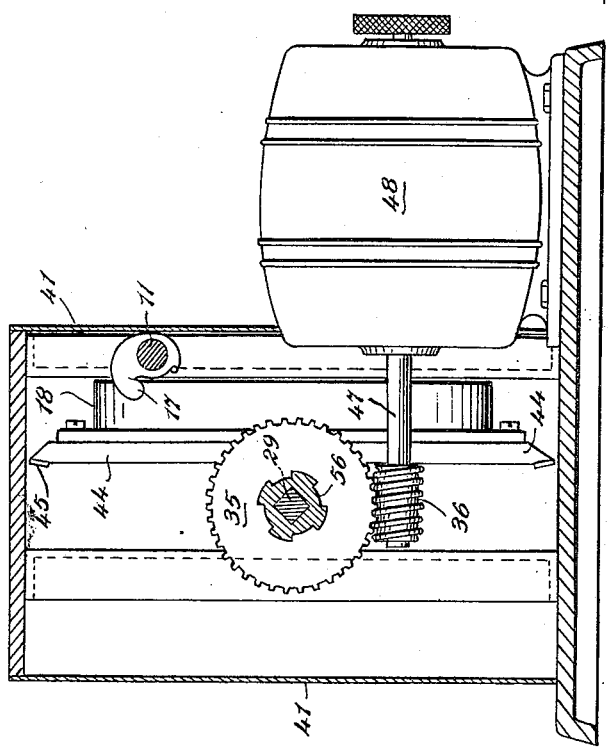

Dec. 22, 1942.          G. ANTONIETTI          2,306,103
MACHINE FOR COMPRESSING AND FORMING PLASTIC MATERIALS
Filed Dec. 12, 1939          5 Sheets-Sheet 5
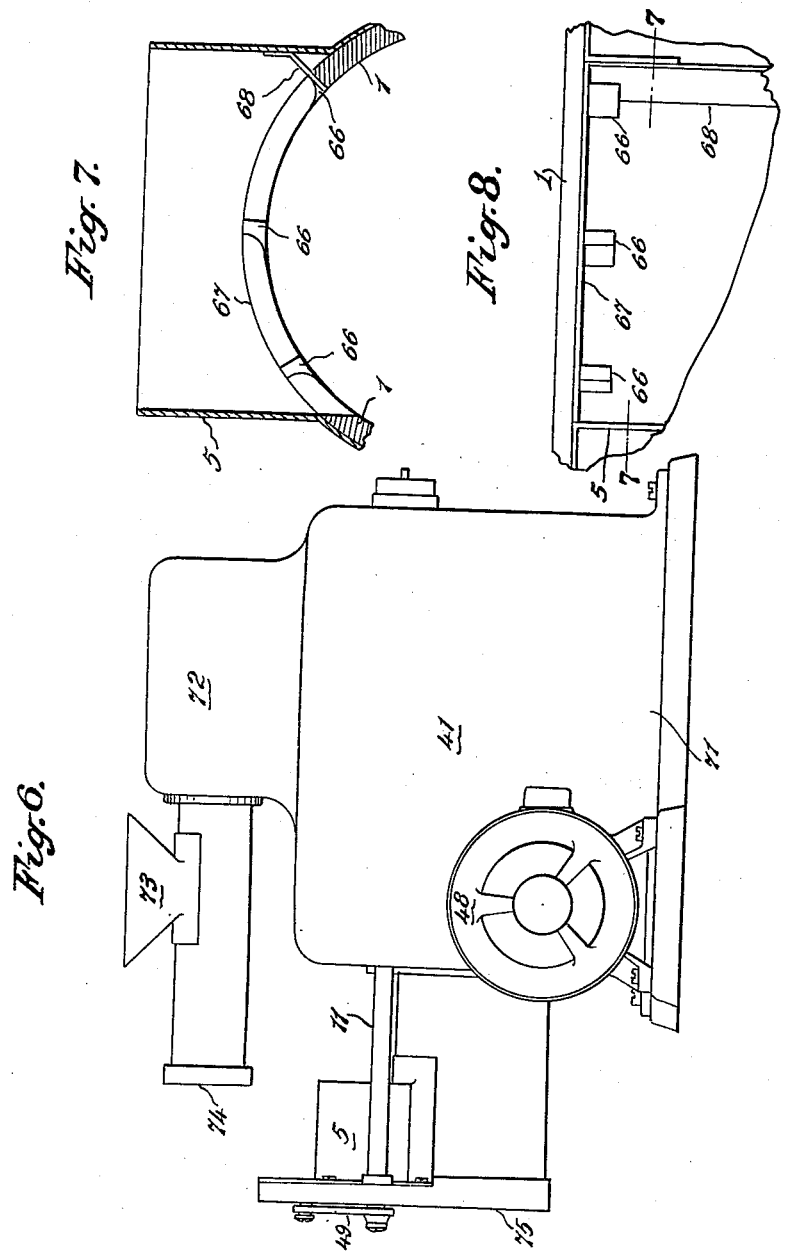
Inventor
G. Antonietti
By: Glascock Downing & Seebold
Attys.

Patented Dec. 22, 1942

2,306,103

UNITED STATES PATENT OFFICE 2,306,103

MACHINE FOR COMPRESSING AND FORMING PLASTIC MATERIALS

Giovanni Antonietti, Rome, Italy; vested in the Alien Property Custodian

Application December 12, 1939, Serial No. 308,872
In Italy March 31, 1939

9 Claims. (Cl. 17—32)

The present invention relates to a machine for compressing and forming plastic materials and the object of the invention is to provide a machine for the treatment of minced meat and like food stuffs which is simple in construction and economical and efficient in operation.

Fig. 1 shows in a vertical longitudinal section the machine constructed in accordance with the invention;

Fig. 2 shows the same machine in horizontal longitudinal section;

Fig. 3 shows in elevation from the right, with the omission of the motor and lateral cover, the machine illustrated in Figs. 1 and 2;

Figs. 4 and 5 are respectively a vertical transversal section according to the axis of the electric motor and a front elevation of the machine.

Fig. 6 is a whole view in elevation from the right illustrating the combination of a meat triturating machine with the machine according to the present invention.

Fig. 7 is an enlarged sectional view taken along the line 7—7 of Fig. 8, and showing a modification of the invention in which the forming chamber is provided with a ring to assist in cutting the meat; and Fig. 8 is an enlarged fragmentary plan view of the modification shown in Fig. 7.

Figs. 9 and 10, show, respectively, enlarged fragmentary plan and elevational views of the piston and with one of the cutting notches.

With reference to the drawings, a cylindric body indicated by reference number 1 contains a cylindric piston 2. A charging mouth 4 provided with a hopper 5 allows the introduction of the plastic material within the cylinder 1. The piston 2 moveable within the cylindric body 1 is fixed to a rod with a square section 29 ending posteriorly with a prolongation 30 connected by means of a ball bearing 31 with a slide 33 moveable within a prismatic guide 34. The slide 33 is provided with a pivot pin 54 cooperating with a cam 43 hereinafter mentioned. A worm wheel 35 receives motion from a worm 36 and transmits said movement by means of a socket 56 provided with a square hole 37, to the shaft with square section 29. The worm wheel 35 is mounted on the cylindric projection 38 of the back wall 39 of the body 1 and is secured thereto in such a manner that its rotation is allowed but any axial sliding is prevented by means of the bush 32 and ring 40. The body 1 is fixed to the casing 41 containing the actuating means of the machine by means of a flange 42 and suitable screws 42'.

The translation movement of the piston 2 is transmitted to the slide 33 by means of the cam groove 43 provided in the face of the disk 44 whose periphery is provided with gear teeth 45 for engaging a bevel pinion 46 carried by the same socket 56 on which the worm wheel 35 is also keyed.

During the rotation of the shaft 47 of the electric motor 48 there turn simultaneously: the disk 44 provided with the eccentric groove 43 producing the axial movement of the piston 2 and the wheel 35 mounted on the socket 56 provided with a square hole 37 producing the rotary movement of the rod with a square section 29 and consequently of the piston 2.

The front moveable wall 7 normally closes the open end of the cylinder 1 and is moved in its guides to open position by a rod 11 through a lever 49 provided with a slot 50 and cooperating with a stud 51 carried by the same wall 7. The lever 49 is secured to the square end 51a of the rod 11 by a screw 51b. The rod 11 is posteriorly provided with an arm 17 cooperating with a cam member having a high portion 18 provided with a lifting portion 19 and a dropping portion 20, secured to the disk, and causing the opening and closure of the front wall 7. A spring 52 tends to constantly move the rod 11 and consequently the lever 49 and moveable wall 7 into the closed position. Positions of the portions 19 and 20 of the member 18 correspond to the positions of the concentric arcs a and b of the cam groove 43, so that during the upward and downward movements of the wall 7 the piston 2 is not displaced axially but continues to rotate around its own axis. From Fig. 1 it appears that the advance of the piston 2 is slower than its return movement owing to the peculiar form of the cam groove 43.

The cylindric body 1 is provided in the back part with apertures 53 and 55 allowing the free vent of the air or of material existing behind the piston 2.

The square rod 29 ends anteriorly with a square head 57 axially sliding within a bush 58 which is internally provided with a square hole and externally with threads and screwed into the casing 59 fixed to the back wall 60 of the piston 2. A spring 61 is inserted between the bottom 62 of the casing 59 and the fore end of the rod 29, while the square head 57 is retained within the bush 58 by means of a washer 63 fixed for instance through screws to said wall 60. Thus the spring 61 affords a yielding connection between the piston 2 and rod 29. The piston 2 has on the fore part one or more notches, Figs. 9 and 10, serving simultaneously as a vent for the material compressed between the fore face of the piston and the fore wall of closure 7 and as a cutting off member for the fibres, especially by means of the edge 65 shaped like a knife and turned in the sense of the rotation movement of the piston 2. In order to cut off the fibres there may be also provided as shown in Figs. 7 and 8, knives 66 fixed to the cylinder 1, which may be provided on the front with a ring consisting of a hard material 67. The hopper 5 may be furthermore bent in 68 so that it may reach according to a radial plane the surface of the piston.

According to Fig. 6 the machine indicated generally by number 71 serving for shaping disks of plastic material, particularly triturated meat is combined in one constructive body alone with a preparatory machine, particularly a triturating device 72 so that the material to be treated is introduced into the hopper 73 triturated (or pasted), poured out again through the exit mouth 74 of the preparatory machine 72 into the hopper 5 of the shaping machine 71 from which the material runs out anteriorly at 75, falling down on a plate or other adapted surface.

The present invention has been illustrated and described in a preferred form but it is clear that constructive changes may be practically introduced therein without departing from the spirit and scope of the invention.

I claim:

1. A machine for compressing and shaping minced meat and like food stuffs comprising, a cylinder, a displaceable end wall for said cylinder, a piston mounted for rotary and axial movement in said cylinder toward and away from said end wall, means for imparting axial movement in both directions to said piston and means for rotating said piston continuously during reciprocation thereof.

2. A machine for compressing and shaping minced meat and like food stuffs comprising a cylinder having a charging opening therein, a displaceable end wall for said cylinder, a piston mounted in said cylinder for rotary and reciprocal movement, means for imparting uninterrupted rotary motion to said piston, and means for imparting axial reciprocating movement to the rotating piston.

3. A machine as claimed in claim 2 characterized in that the reciprocating means is driven by the rotating means.

4. A machine as claimed in claim 2 characterized by the provision of power operated means connected with the rotating means and a driving connection between the rotating means and the reciprocating means.

5. A machine as claimed in claim 2, characterized in that said reciprocating means includes a slide connected with the piston and a cam device coacting with said slide.

6. A machine as claimed in claim 1 characterized in that said piston is provided on its anterior edge with notches for the free passage of fibers and for cutting off said fibers.

7. A machine as claimed in claim 1 characterized in that said piston is provided on its anterior edge with notches for the free passage of fibers and for cutting off said fibers, the posterior edge of the cylinder being provided with fixed knives.

8. A machine as claimed in claim 2 characterized in that said means for imparting axial movement to the piston is constituted by a cam device having a portion arranged to effect a compression stroke of the piston, a second portion for partially withdrawing the piston and decompressing the material acted thereon and a portion for effecting further displacement of the piston and ejection of the material.

9. A machine as claimed in claim 2 characterized in that said means for imparting axial movement to the piston is constituted by a cam device having a portion arranged to effect a compression stroke of the piston, a second portion for partially withdrawing the piston and decompressing the material acted thereon and a portion for effecting further displacement of the piston and ejection of the material, and in having means for imparting movement to said end wall to effect detachment of the ejected material from the piston, said end wall having a cutting edge coacting with the piston.

GIOVANNI ANTONIETTI.